(12) United States Patent
Morisawa

(10) Patent No.: US 6,532,268 B1
(45) Date of Patent: Mar. 11, 2003

(54) RECEIVING APPARATUS AND TRANSMITTING/RECEIVING SYSTEM

(75) Inventor: Takashi Morisawa, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/247,943

(22) Filed: Feb. 11, 1999

(30) Foreign Application Priority Data

Feb. 13, 1998 (JP) .............................................. 10-031456

(51) Int. Cl.[7] .............................. H04B 3/00; H04L 25/00
(52) U.S. Cl. ...................... 375/257; 375/260; 375/241; 340/310.02; 340/310.03
(58) Field of Search ................................. 375/140, 141, 375/257, 272, 279, 260, 219; 340/310.01, 310.02, 310.03, 310.08

(56) References Cited

U.S. PATENT DOCUMENTS 4,782,322 A * 11/1988 Lechner et al. ........ 340/310.02
5,351,272 A * 9/1994 Abraham .................... 375/260
5,355,114 A * 10/1994 Sutterlin et al. ....... 340/310.02

* cited by examiner

Primary Examiner—Phuong Phu
(74) Attorney, Agent, or Firm—Rader, Fishman & Grauer PLLC; Ronald P. Kananen

(57) ABSTRACT

A transmitting/receiving system and a receiving apparatus wherein a plurality of information signals having mutually different frequency bands processed through predetermined modulation are transmitted in time series from a transmitting apparatus via an electric power line. A desired information signal is selected out of the plural transmitted information signals, and the transmission quality of the selected information signal is measured. When the result representing the measured transmission quality is low, the signal being currently received is switched to the information signal having another frequency band indicating a better transmission quality.

12 Claims, 4 Drawing Sheets

RECEIVING APPARATUS AND TRANSMITTING/RECEIVING SYSTEM

BACKGROUND OF THE INVENTION

1. Field of the Invention

The present invention relates to a receiving apparatus and a transmitting/receiving system which are capable of transmitting and/or receiving, between rooms spaced apart from each other, data outputted via an electric power line (outlet) from an electronic apparatus such as an audio unit, a video unit or a computer installed in a house for example.

2. Description of the Related Art

There is proposed a power-line communication system where data outputted from an electronic apparatus such as an audio unit, a video unit or a computer installed in a house for example are transmitted and received via an electric power line (outlet).

The above power-line communication system is adapted for transmitting various information signals via an electric power line as a transmission path furnished to supply commercial power therethrough. In this power-line communication system, an output signal to be sent is generated by converting, through a modem, a data set outputted from a personal computer or the like, and then the data set thus obtained is sent via an electric power line from an outlet. Also according to the power-line communication system, the output signal delivered to the power line is received via the outlet, and then the data set is demodulated. Thus, the power-line communication system is capable of transmitting various information signals with facility and simplicity by the use of an existing power line in a house or the like.

Since a variety of electric apparatus are mutually connected via the power line with outlets, various noises are generated from such electric apparatus, whereby extreme disturbance noises are caused in the power-line communication system.

In addition to connection of various electric apparatus to the power line via outlets, various kinds of wires are arranged in various forms at various positions, so that it is difficult to specify the characteristic impedance. Consequently, by applying to a power-line communication system, generation of a zero transmission point and a nonlinear phase characteristic is unavoidable due to the impedance mismatching. Thus, in the power-line communication system, there have been some disadvantages including that the signal level of a transmission signal inputted via an outlet is extremely lowered depending on the position where a receiving apparatus is connected to the power line, and further the signal level of the transmission signal is varied.

On account of the problems mentioned, it has been difficult heretofore in the power-line communication system to achieve exact transmission of an information signal with stability and certainty.

When stable and certain transmission of an information signal is difficult to achieve as described, it becomes eventually necessary to transmit the information signal at a lower transfer rate. Besides the above, a repeated transmission of the data may be required that may consequently impair real-time transmission of the information signal.

SUMMARY OF THE INVENTION

It is therefore an object of the present invention to provide improvements in a receiving apparatus and a transmitting/receiving system which are capable of realizing exact transmission and reception of information signals with stability and certainty.

According to one aspect of the present invention, there is provided a receiving apparatus for receiving a plurality of information signals having mutually different frequency bands modulated and sent from a transmitting apparatus via an electric power line. The receiving apparatus has a receiving means for selectively receiving the information signal of a unique frequency band out of the plural information signals having mutually different frequency bands transmitted via the power line; a transmission quality decision means for deciding the transmission quality of the information signal having the unique frequency band received selectively by the receiving means; and a switching control means for switching under control the information signal received by the receiving means in response to the result of the decision obtained from the transmission quality decision means.

According to another aspect of the present invention, there is provided a transmitting/receiving system consisting of a transmitting apparatus and a receiving apparatus. The transmitting apparatus comprises a transmitting means for sending a plurality of modulated information signals having mutually different frequency bands via an electric power line. The receiving apparatus comprises a receiving means for selectively receiving the information signal having a unique frequency band out of the plural information signals having mutually different frequency bands transmitted via the power line; a transmission quality decision means for deciding the transmission quality of the information signal of the unique frequency band received selectively by the receiving means; and a switching control means for switching under control the information signal received by the receiving means in response to the result of the decision obtained from the transmission quality decision means.

The above and other features and advantages of the present invention will become apparent from the following description which will be given with reference to the illustrative accompanying drawings.

DESCRIPTION OF THE PREFERRED EMBODIMENTS

Hereinafter some preferred embodiments of the present invention will be described in detail with reference to the accompanying drawings.

Figure 1:
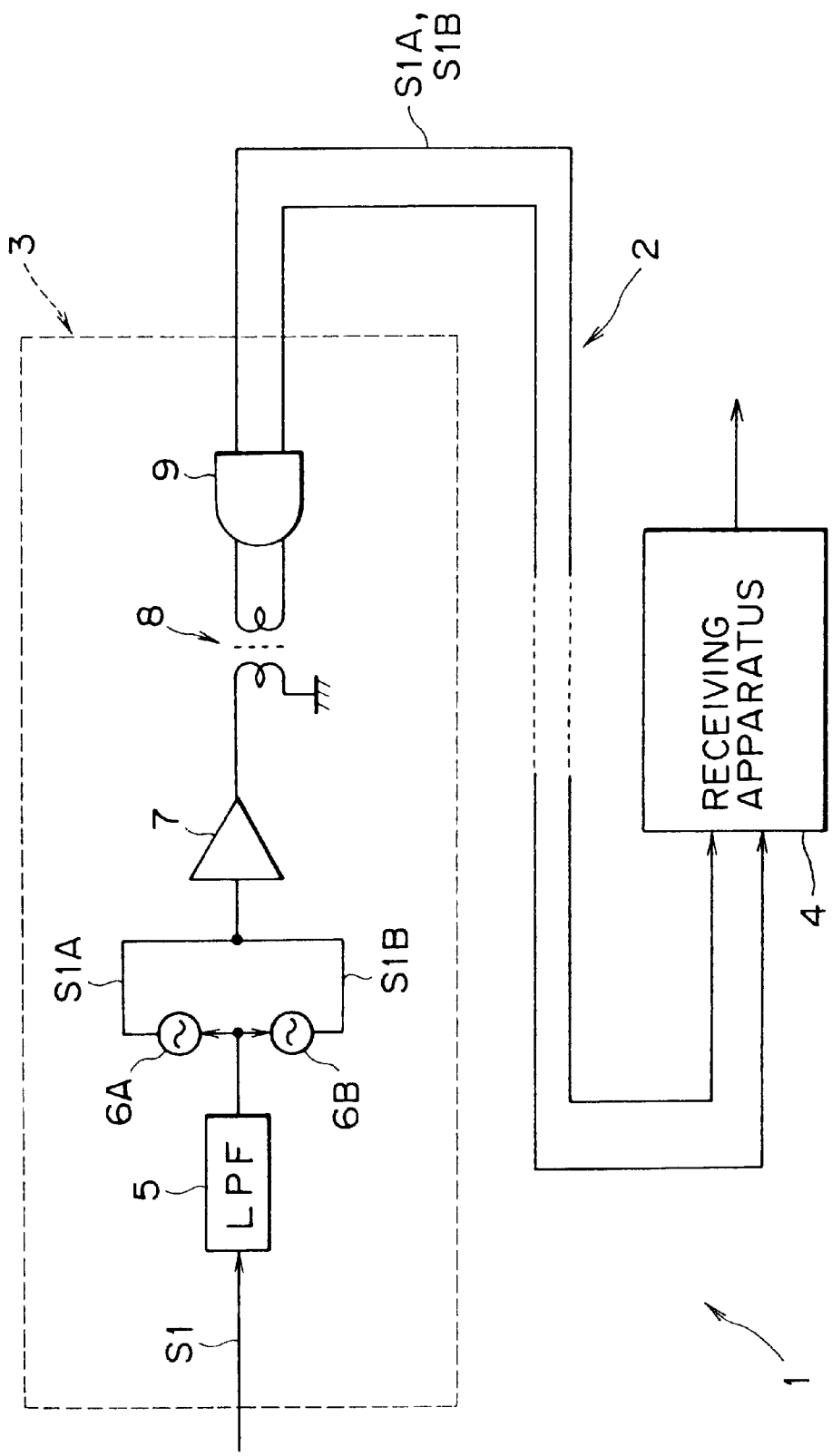
FIG. 1 is an overall block diagram of a power-line communication system where the present invention is applied, with a detailed block diagram of a receiving apparatus side.
Figure 2:
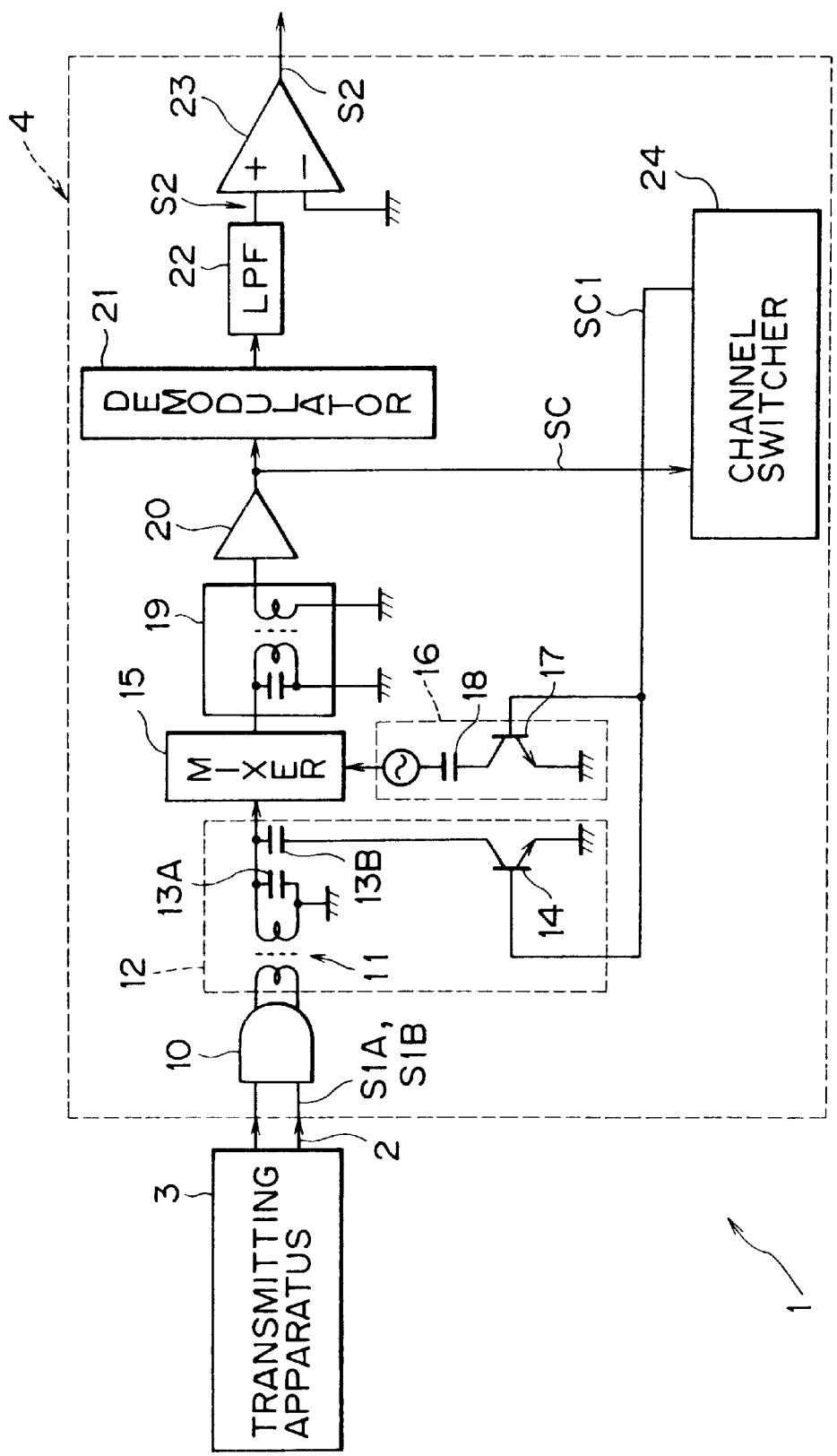
FIG. 2 is an overall block diagram of the power-line communication system where the present invention is applied, with a detailed block diagram of a transmitting apparatus.

Referring now to FIGS. 1 and 2 where a block diagram of a power-line communication system representing an embodiment of the invention is shown, the system 1 consists of a transmitting apparatus 3 and a receiving apparatus 4 connected to each other via a power line 2, and it is applied to transmission of an information signal S1 composed of video data, audio data or the like outputted from an electronic apparatus such as a personal computer.

In this configuration, the transmitting apparatus 3 receives an information signal S1 of serial data from the personal computer or the like, and then limits the band of the information signal Si through a low pass filter (LPF) 5. Modulator circuits 6A and 6B perform frequency modulation of the output signal of the low pass filter 5 by different carrier frequencies to produce modulated transmission signals S1A and S1B of mutually different bands.

An amplifier circuit 7 adds the two transmission signals S1A and S1B to each other and, after amplifying the result with a predetermined gain, outputs the amplified signal to a plug 9 via an insulating transformer 8. The plug 9 is so formed as to be inserted into an outlet in a user's desired room to be thereby connected to the power line 2. Due to such a structure, the transmitting apparatus 3 produces a plurality of transmission signals S1A and S1B of mutually different frequency bands obtained through frequency modulation of the information signal S1, and sends the plural transmission signals S1A and S1B to the power line 2.

As shown in FIG. 1, the receiving apparatus 4 is connected to the power line 2 by inserting a plug 10 thereof into a desired outlet.

An insulating transformer 11 is connected to the power line 2 via the plug 10, and a resonant capacitor 13A is connected in parallel to a secondary winding. Consequently, the insulating transformer 11 inputs, through insulation from a commercial power source, the signals S1A and S1B transmitted via the power line 2. Further the transformer 11 constitutes a tuner circuit 12 in combination with the secondary winding and the resonant capacitor 13A, hence inputting either the signal S1A or S1B selectively.

In the insulating transformer 11, one end of a resonant capacitor 13B is connected to the hot-side end of the secondary winding, while the other end of the resonant capacitor 13B is grounded via a transistor 14 whose on/off action is switched by a channel switching signal SC1. Consequently in the insulating transformer 11, when the transistor 14 is turned on to thereby ground the other end of the resonant capacitor 13B, the tuned frequency is lowered correspondingly thereto.

Thus, in combination with the resonant capacitors 13A, 13B and the transistor 14, the insulating transformer 11 constitutes the tuner circuit 12 which switches the tuned frequency in accordance with the channel switching signal SC1, hence inputting either the transmission signal S1A or S1B selectively.

A mixer 15 produces an intermediate frequency signal through frequency conversion of the input signal from the tuner circuit 12 by a local oscillation signal outputted from a local oscillator 16. The local oscillator 16 is so formed that a capacitor 18 constituting a portion of the oscillation circuit is grounded via a transistor 17 whose on/off action is switched by a channel switching signal SC1. Consequently in the mixer 15, the transmission signal S1A or S1B inputted selectively from the tuner circuit 12 is converted into an intermediate frequency signal in response to the channel switching signal SC1, and then the converted signal is outputted.

An intermediate frequency transformer 19 selects the frequency band of the intermediate frequency signal out of the entire output signals obtained from the mixer 15, and then outputs the signal of the selected frequency band. An amplifier circuit 20 amplifies the intermediate frequency signal SC outputted from the intermediate frequency transformer 19 with a predetermined gain and then outputs the amplified signal. A demodulator circuit 21 performs frequency demodulation of the intermediate frequency signal SC, and a low pass filter 22 limits the band of the output signal of the demodulator circuit 21.

Figure 3:
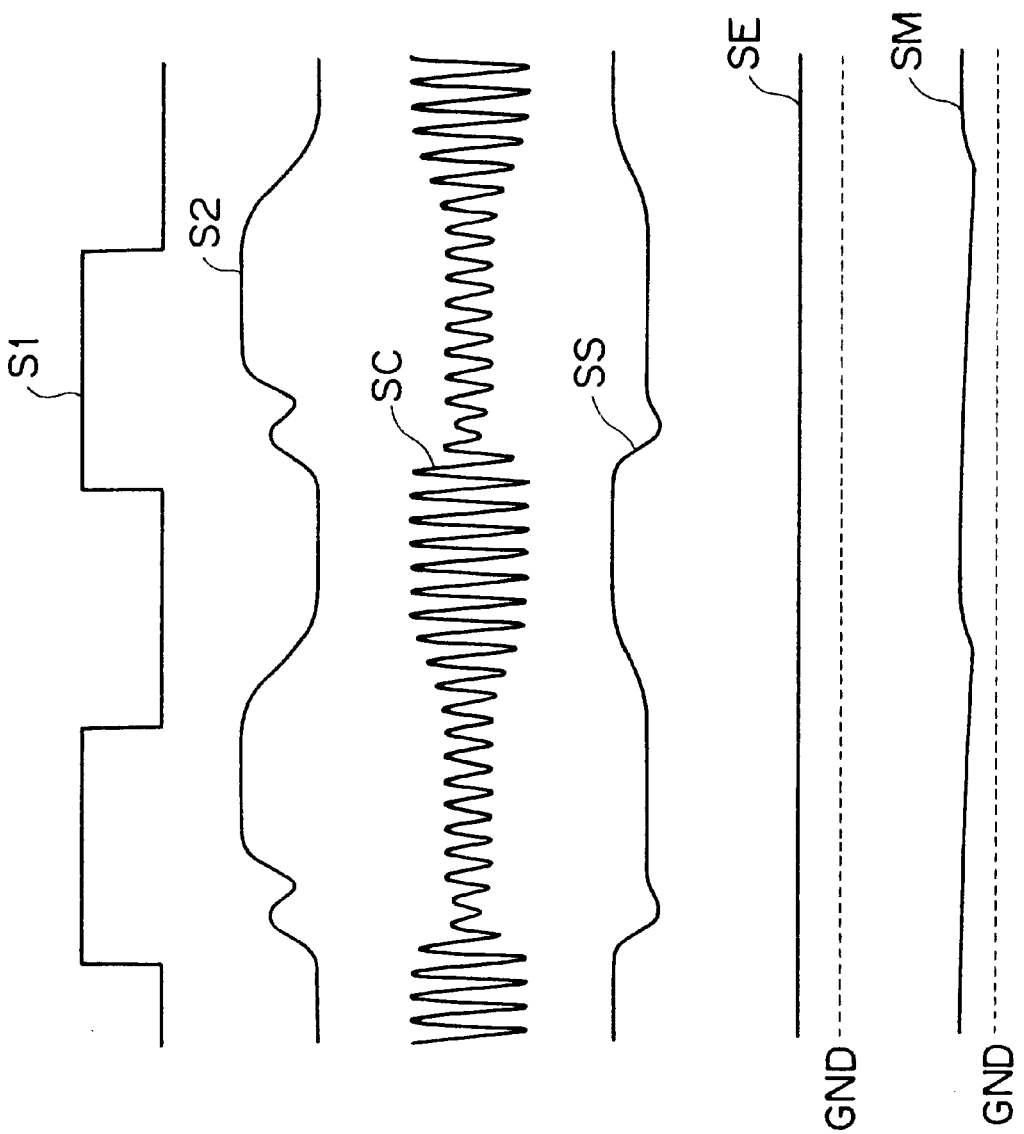
FIG. 3A is a timing chart of an information signal S1 transmitted from a transmitting apparatus 3.
FIG. 3B is a timing chart of an information signal S2 inputted to a comparator 23 in a receiving apparatus 4.
FIG. 3C is a timing chart of an intermediate frequency signal SC inputted to a channel switcher 24 in the receiving apparatus 4.
FIG. 3D is a timing chart of an envelope detection signal SS obtained through envelope detection of the intermediate frequency signal SC.
FIG. 3E is a timing chart of a signal level detection signal SE obtained by processing the average value in the envelope detection signal SS.
FIG. 3F is a timing chart of a pulsating component detection signal SM obtained by detecting the peak value of the AC component in the envelope detection signal SS.

FIG. 3A shows the information signal S1 obtained from the transmitting apparatus 3. The information signal S1 sent from the transmitting apparatus 3 to the receiving apparatus 4 is band-limited while the phase characteristic and the amplitude characteristic thereof are changed in conformity with the characteristic of the transmission path in the power line 2, and a reproduced signal S2 of FIG. 3B is inputted to a comparator 23, where the binary-coded information signal is recovered. The receiving apparatus 4 processes the information signal through reproduction of the clock from this recovered information signal to thereby reproduce the original serial data set.

A channel switcher 24 receives the intermediate frequency signal SC outputted from the amplifier circuit 20, and after deciding the transmission quality of the signal being currently received in response to the intermediate frequency signal SC, switches the currently received signal upon detection of a deterioration of the transmission quality.

Figure 4:
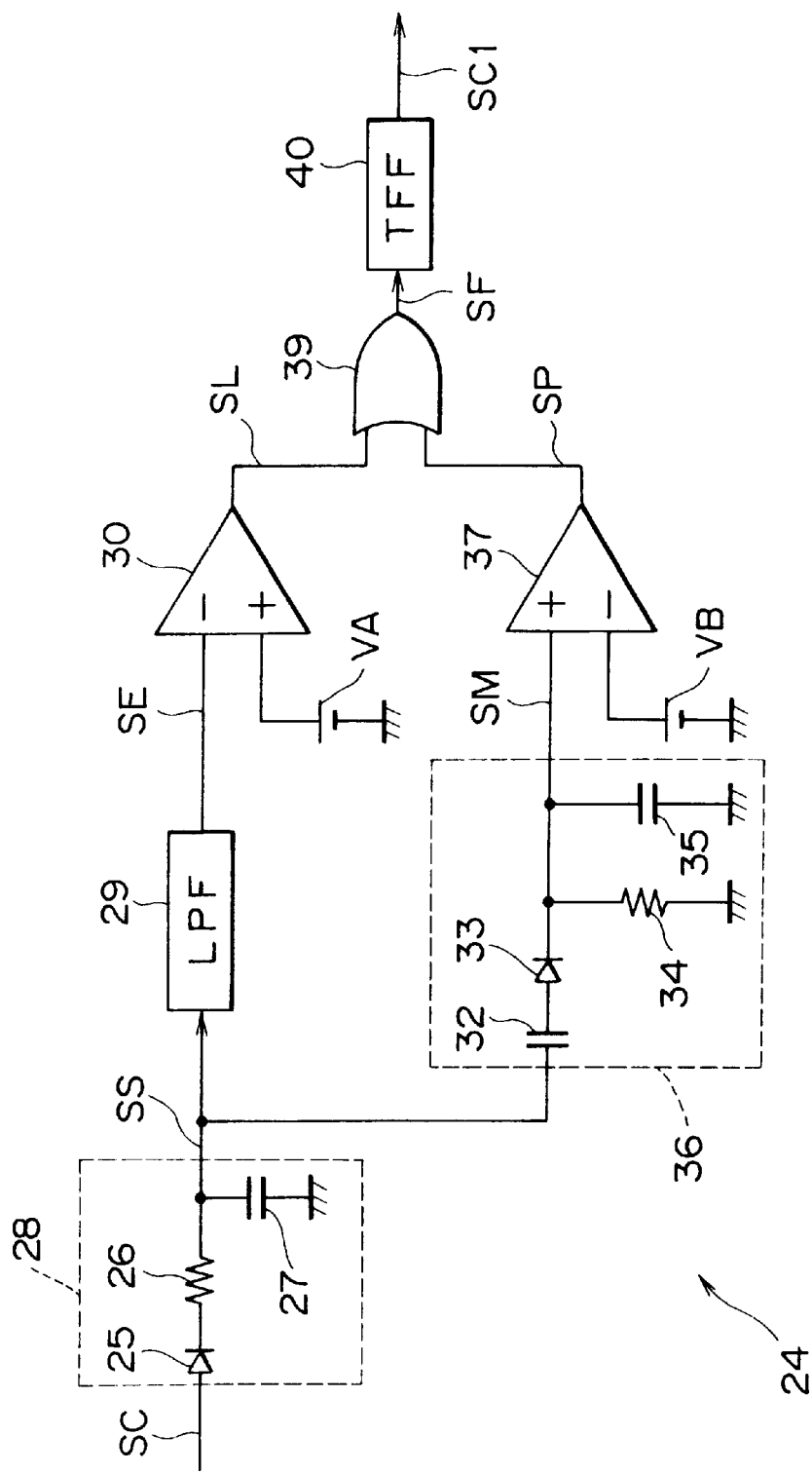
FIG. 4 is a detailed block diagram of a channel switcher 24 in the receiving apparatus 4 of the present invention.

FIG. 4 shows a block diagram of the channel switcher 24. In the channel switcher 24, the intermediate frequency signal SC is rectified by a diode 25 and then is inputted to a low pass filter consisting of a resistor 26 and a capacitor 27, Thus, the input stage of the channel switcher 24 constitutes an envelope detector 28 as a combination of the diode 25, the resistor 26 and the capacitor 27, which produces an envelope detection signal SS obtained by detecting the envelope of the intermediate frequency signal SC shown in FIG. 3D.

A low pass filter (LPF) 29 limits the band of the envelope detection signal SS to thereby average the signal SS and then outputs the average value. In this manner, the channel switcher 24 detects a signal level detection signal SE of FIG. 3E whose signal level is changed in accordance with the average signal level of the transmission signal being currently received.

A comparator 30 compares the signal level detection signal SE with a predetermined reference voltage VA, and raises the signal level of the output signal SL in response to a fall of the average signal level of the currently received signal below the signal level corresponding to the reference voltage VA. Consequently, the average signal level of the transmission signal inputted to the receiving apparatus 4 is changed in compliance with the zero transmission point and the nonlinear phase characteristic in addition to the transmission distance. Upon fall of the signal level below a predetermined value, the S/N ratio (signal-to-noise ratio) is deteriorated correspondingly to such a fall. Particularly in transmitting the frequency-modulated information signal, the C/N ratio (carrier-to-noise ratio) of the demodulated result is varied extremely due to deterioration of the S/N ratio at the boundary of the improvement limit point. Thus, with reference to the average signal level, the comparator 30 makes a decision relative to the transmission quality of the signal being currently received.

A capacitor 32 eliminates the DC component included in the envelope detection signal SS and then outputs the result. Subsequently a diode 33 rectifies the output signal of the capacitor 32 and supplies the rectified signal to a parallel circuit consisting of a resistor 34 and a capacitor 35. The capacitors 32, 35, the resistor 34 and the diode 33 constitute an AC peak detector 36 which detects the peak by extracting the AC component included in the envelope detection signal SS. Thus, the AC peak detector 36 detects a variation detection signal SM of FIG. 3F whose signal level is changed in compliance with the amplitude change of the envelope detection signal SS, thereby detecting the signal level variation in the transmission signal being currently received.

A comparator 37 compares the variation detection signal SM with a predetermined reference voltage VB, and raises the signal level of the output signal SP in response to a rise of the variation of the currently received signal above the signal level corresponding to the reference voltage VB. Therefore, in transmitting the frequency-modulated information signal, ideally the signal level is not varied. However, in actual transmission via a power line, the phase characteristic is changed in various manners due to reflection and so forth from the other apparatus connected to the power line, whereby the resultant signal level variation is detected. When such signal level variation is large, the transmission quality of the signal is determined to be deteriorated. Thus, with reference to the variation of the transmission signal, the comparator 37 makes a decision relative to the transmission quality of the signal being currently received.

An OR circuit 39 produces a logical sum signal SF from the output signal SL of the comparator 30 and the output signal SP of the comparator 37. A trigger flip-flop (TFF) 40 inverts the logical level of the channel switching signal SC1 in compliance with a rise of the logical sum signal SF and then outputs the inverted signal. When the transmission quality of the signal being currently received is lowered below a predetermined level, the OR circuit 39 and the trigger flip-flop 40 invert the logical level of the channel switching signal SC1 and then switch the transmission signal to be received.

In the configuration mentioned above, the information signal S1 composed of the serial data outputted from the electronic apparatus is band-limited by the low pass filter 5 (LPF) in the transmitting apparatus 3, and then the signal S1 is frequency-modulated at mutually different carrier frequencies in the modulator circuits 6A and 6B to be thereby converted into transmission signals S1A and S1B of mutually different frequency bands.

Subsequently the transmission signals S1A and S1B are amplified in the amplifier circuit 7 and then are delivered to the power line 2 via the plug 9. Therefore, although zero transmission points and nonlinear phase characteristics are generated periodically regarding the transmission signals S1A and S1B due to the characteristic impedance of the power line 2, the zero transmission points are caused at different positions because of the difference of the frequency bands, and the nonlinear phase characteristics between the zero transmission points are also rendered different from each other.

Thus, even when the transmission quality of either one signal S1A or S1B is deteriorated depending on the position of the installed receiving apparatus 4, it is still possible to ensure a satisfactory transmission quality relative to the other signal S1B or S1A.

One of the signals S1A and S1B transmitted through the power line 2 shown in FIG. 2 is selected in the tuner circuit 12 consisting of the insulating transformer 11 and the resonant capacitors 13A and 13B, and then the selected transmission signal is converted into an intermediate frequency signal by the mixer 15 in the next stage. Subsequently the selectivity of the intermediate frequency signal is increased by the intermediate frequency transformer 19 and then is demodulated by the demodulator circuit 21. Further the output signal of the demodulator circuit 21 is band-limited by the low pass filter 22, and then binary identification thereof is executed in the comparator 23 to thereby reproduce the information signal S2.

The information signal S2 thus reproduced is envelope-detected by the envelope detector 28 in the channel switcher 24, so that an envelope detection signal SS is obtained therefrom. This signal SS is averaged by the low pass filter 29. In this manner, the average signal level of the information signal S2 is detected with regard to the signal being currently received. Further, when the average signal level of the information signal S2 becomes lower than a predetermined signal level with a fall of the transmission quality of the signal being currently received, such fall of the transmission quality is detected on the basis of the result SL of comparing the signal level detection signal SE, which is outputted from the low pass filter 29, with the reference voltage VA. Subsequently the tuned frequency of the tuner circuit 12 and the oscillation frequency of the local oscillator 16 are switched via the OR circuit 39 and the trigger flip-flop 40, whereby there is received the other signal whose transmission quality is better than that of the signal being currently received. Therefore, the receiving apparatus 4 can receive the transmitted information represented by the signal of a higher transmission quality which is better than that of the currently received signal.

Further regarding the information signal S1, the amplitude variation of the signal being currently received is detected from the variation of the envelope detection signal SS obtained from the AC peak detector 36, and the deterioration of the transmission quality with reference to the signal level variation is detected on the basis of the result of comparing the variation detection signal SM, which is detected by the AC peak detector 36, with the predetermined reference voltage VB. Consequently, the tuned frequency of the tuner circuit 12 and the oscillation frequency of the local oscillator 16 are selectively switched also due to the deterioration of the transmission quality based on the transmitted signal variation, so that there is received the other signal of a higher transmission quality better than that of the signal being currently received.

According to the configuration mentioned above, information signals are transmitted in a plurality of frequency bands, so that the average signal level and the variation of the signal being currently received are detected in the receiving apparatus on the basis of the signal level of the intermediate frequency signal, and then the transmission signal to be received is selectively switched upon detection of the transmission quality deterioration from the average signal level and the variation. Thus, it becomes possible to realize improved transmission of the information signal by selecting the frequency band where a better transmission quality is attainable, hence achieving satisfactory transmission of the information signal via the power line with stability and certainty. Consequently, transmission of the data can be enhanced at a higher transfer rate of the information signal, thereby accomplishing real-time transmission of the information signal with reduction of the repeated data retransmission.

In the preferred embodiment, there is described an example where a transmission signal is produced by modulating an information signal through FSK (frequency shift keying). However, the present invention is not limited to the above example alone, and the transmission signal may be produced by modulating the information signal through ASK (amplitude shift keying), PSK (phase shift keying) or spread spectrum modulation as well. In any of such cases to transmit the signal processed through PSK, ASK or spread spectrum modulation, it is possible to omit the decision of the transmission quality executed in FIG. 4 by detecting the variation of the transmission signal.

Also in the preferred embodiment, there is described an example where transmission signals of mutually different frequency bands are produced in the modulator circuits 6A and 6B having mutually different carrier frequencies. However, the present invention is not limited to this example alone, and transmission signals of different frequency bands may be produced through frequency conversion of a transmission signal obtained from a single modulator circuit.

Further in the preferred embodiment, there is described an example where information signals are transmitted in two frequency bands respectively. However, the present invention is not limited to such example alone, and the transmission may be performed in three or more frequency bands. In this case, it becomes possible to transmit various information signals with reduction of harmful influences that may otherwise be derived from noise disturbance and so forth.

Also in the preferred embodiment, there is described an example where the information signal is demodulated after converting the received signal into an intermediate frequency signal. However, the present invention is not limited thereto alone, and it can be widely applied to the use of various reception methods as well.

Further in the preferred embodiment, there is described an exemplary case of constituting a power-line communication system by the use of a single transmitting apparatus and a single receiving apparatus. However, the present invention is not limited merely to the above example, and it is widely applicable to some other case where a plurality of transmitting and receiving apparatus are installed.

Thus, according to the present invention, information signals for transmission are sent through a plurality of channels having mutually different frequency bands, so that the frequency band of a better transmission quality can be selected on the receiving side to receive the information signal transmitted thereto, whereby it is rendered possible to transmit the information signal via a power line with stability and certainty.

What is claimed is:

1. A receiving apparatus for receiving a plurality of information signals having mutually different frequency bands processed through predetermined modulation and transmitted via an electric power line from a transmitting apparatus, comprising:

a receiving means for selectively receiving an information signal of a desired frequency band out of the plural information signals having mutually different frequency bands transmitted via the power line;

a transmission quality decision means for deciding the transmission quality of the information signal having the unique frequency band received selectively by said receiving means; and a switching control means for switching under control the information signal received by said receiving means in response to the result of the decision executed by said transmission quality decision means, wherein said transmission quality decision means comprises an envelope detection means for detecting the envelope of the received information signal having the unique frequency band; an average level detection means for detecting the average level of the envelope signal obtained from said envelope detection means; and a comparison means for comparing the average level, which is detected by said average level detection means, with a reference value; wherein the information signal received by said receiving means is switched under control in response to the result of the comparison executed by said comparison means.

2. The receiving apparatus according to claim 1, wherein the received information signal having the unique frequency band is the one modulated by phase shift keying.

3. The receiving apparatus according to claim 1, wherein the received information signal having the unique frequency band is the one modulated by amplitude shift keying.

4. The receiving apparatus according to claim 1, wherein the received information signal having the unique frequency band is the one modulated by a spread spectrum method.

5. A receiving apparatus for receiving a plurality of information signals having mutually different frequency bands processed through predetermined modulation and transmitted via an electric power line from a transmitting apparatus, comprising:

a receiving means for selectively receiving an information signal of a desired frequency band out of the plural information signals having mutually different frequency bands transmitted via the power line;

a transmission quality decision means for deciding the transmission quality of the information signal having the unique frequency band received selectively by said receiving means; and a switching control means for switching under control the information signal received by said receiving means in response to the result of the decision executed by said transmission quality decision means, wherein said transmission quality decision means comprises an envelope detection means for detecting the envelope of the received information signal having the unique frequency band; an average level detection means for detecting the average level of the envelope signal obtained from said envelope detection means; a first comparison means for comparing the average level, which is detected by said average level detection means, with a reference value; a DC component elimination means for eliminating the DC component from the envelope signal detected by said envelope detection means; an AC peak detection means for detecting the peak value of the AC component obtained from said DC component elimination means; and a second comparison means for comparing the peak value, which is obtained from said AC peak detection means, with a reference value; wherein the information signal received by said receiving means is switched under control in response to the results of the comparisons executed by said first and second comparison means.

6. The receiving apparatus according to claim 5, wherein the received information signal having the unique frequency band is the one modulated by frequency shift keying.

7. A receiving apparatus for receiving a plurality of information signals having mutually different frequency bands processed through predetermined modulation and transmitted via an electric power line from a transmitting apparatus, comprising:

a receiving means for selectively receiving an information signal of a desired frequency band out of the plural information signals having mutually different frequency bands transmitted via the power line;

a transmission quality decision means for deciding the transmission quality of the information signal having the unique frequency band received selectively by said receiving means; and a switching control means for switching under control the information signal received by said receiving means in response to the result of the decision executed by said transmission quality decision means, wherein said transmission quality decision means comprises an envelope detection means for detecting the envelope of the received information signal having the unique frequency band; an average level detection means for detecting the average level of the envelope signal obtained from said envelope detection means; and a comparison means for comparing the average level, which is detected by said average level detection means, with a reference value; wherein the information signal received by said receiving means is switched under control in response to the result of the comparison executed by said comparison means.

8. The transmitting/receiving system according to claim 7, wherein the received information signal having the unique frequency band is the one modulated by phase shift keying.

9. The transmitting/receiving system according to claim 7, wherein the received information signal having the unique frequency band is the one modulated by amplitude shift keying.

10. The transmitting/receiving system according to claim 7, wherein the received information signal having the unique frequency band is the one modulated by a spread spectrum method.

11. A receiving apparatus for receiving a plurality of information signals having mutually different frequency bands processed through predetermined modulation and transmitted via an electric power line from a transmitting apparatus, comprising:

a receiving means for selectively receiving an information signal of a desired frequency band out of the plural information signals having mutually different frequency bands transmitted via the power line;

a transmission quality decision means for deciding the transmission quality of the information signal having the unique frequency band received selectively by said receiving means; and a switching control means for switching under control the information signal received by said receiving means in response to the result of the decision executed by said transmission.quality decision means, wherein said transmission quality decision means comprises an envelope detection means for detecting the envelope of the received information signal having the unique frequency band; an average level detection means for detecting the average level of the envelope signal obtained from said envelope detection means; a first comparison means for comparing the average level, which is detected by said average level detection means, with a reference value; a DC component elimination means for eliminating the DC component from the envelope signal detected by said envelope detection means; an AC peak detection means for detecting the peak value of the AC component obtained from said DC component elimination means; and a second comparison means for comparing the peak value, which is obtained from said AC peak detection means, with a reference value; wherein the information signal received by said receiving means is switched under control in response to the results of the comparisons executed by said first and second comparison means.

12. The transmitting/receiving system according to claim 11, wherein the received information signal having the unique frequency band is the one modulated by frequency shift keying.

* * * * *